(12) United States Patent
Nakamura et al.

(10) Patent No.: US 8,321,532 B2
(45) Date of Patent: Nov. 27, 2012

(54) INFORMATION PROCESSING SYSTEM, INFORMATION PROCESSING TERMINAL, AND COMPUTER READABLE MEDIUM

(75) Inventors: Tomoki Nakamura, Nagoya (JP); Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 370 days.

(21) Appl. No.: 12/394,566

(22) Filed: Feb. 27, 2009

(65) Prior Publication Data

US 2009/0222529 A1    Sep. 3, 2009

(30) Foreign Application Priority Data

Feb. 29, 2008   (JP) ................................. 2008-049356

(51) Int. Cl.
*G06F 15/16* (2006.01)
(52) U.S. Cl. ........ 709/219; 709/203; 709/224; 709/226; 709/229; 358/1.15
(58) Field of Classification Search .................. 709/203, 709/219, 224, 226, 229; 358/1.15
See application file for complete search history.

(56) References Cited

U.S. PATENT DOCUMENTS

| 6,266,693 | B1 * | 7/2001 | Onaga ........................... 709/219 |
| 7,689,824 | B2 * | 3/2010 | Imaizumi et al. ............. 713/169 |
| 7,755,792 | B2 * | 7/2010 | Sakayama et al. ........... 358/1.15 |
| 2004/0153516 | A1 * | 8/2004 | Maekawa et al. ............. 709/206 |
| 2005/0023339 | A1 * | 2/2005 | Uno .............................. 235/375 |
| 2005/0190395 | A1 * | 9/2005 | Aritomi ....................... 358/1.13 |
| 2006/0077425 | A1 * | 4/2006 | Nakata et al. ................ 358/1.15 |
| 2006/0126100 | A1 * | 6/2006 | Jung ............................ 358/1.14 |
| 2006/0212527 | A1 * | 9/2006 | Tonegawa et al. ............ 709/206 |
| 2007/0104042 | A1 | 5/2007 | Sugahara et al. |
| 2007/0198649 | A1 | 8/2007 | Kamata et al. |
| 2007/0283157 | A1 * | 12/2007 | Yami et al. .................... 713/175 |
| 2008/0055634 | A1 * | 3/2008 | Miyahara ..................... 358/1.15 |
| 2008/0055661 | A1 * | 3/2008 | Yoshida ........................ 358/403 |
| 2008/0151307 | A1 * | 6/2008 | Minamida et al. ........... 358/3.24 |

FOREIGN PATENT DOCUMENTS

| JP | 2001-331395 | 11/2001 |
| JP | 2004-167958 | 6/2004 |
| JP | 2005209288 | 8/2005 |
| JP | 2007219969 | 8/2007 |

OTHER PUBLICATIONS

Notification of Reason for Refusal for Japanese Patent Application 2008-049356 mailed on Apr. 27, 2010.

* cited by examiner

*Primary Examiner* — Phuoc Nguyen
(74) *Attorney, Agent, or Firm* — Banner & Witcoff, Ltd.

(57) ABSTRACT

An information processing system includes: an external device; and information processing terminals. The information processing terminal includes: a storage unit configured to store identification information unique to the information processing terminal; an obtaining unit configured to obtain media information from the external device, the media information relating to a recording medium attached to the external device; a detecting unit configured to detect notification destination identification information from the media information, the notification destination identification information indicating a notification destination of information relating to the recording medium; a first determining unit configured to determine whether the notification destination identification information matches the identification information; and a notification executing unit configured to execute a notification relating to the recording medium attached to the external device, if the first determining unit determines that the notification destination identification information matches the identification information.

15 Claims, 8 Drawing Sheets

INFORMATION PROCESSING SYSTEM, INFORMATION PROCESSING TERMINAL, AND COMPUTER READABLE MEDIUM

CROSS-REFERENCE TO RELATED APPLICATIONS

This application is based upon and claims priority from Japanese Patent Application No. 2008-049356 filed on Feb. 29, 2008, the entire contents of which are incorporated herein by reference.

TECHNICAL FIELD

One aspect of the present invention relates to: an information processing system including an external device that allows a recording medium to be detachably attached and a plurality of information processing terminals; an information processing terminal; and a computer readable medium storing a control program for an information processing terminal. One example of the present invention relates to an information processing system that can provide a notification relating to the recording medium attached to the attachment unit, an information processing terminal, and a control program for the information processing terminal.

BACKGROUND

An information processing system including an external device to which a recording medium is attached and a single information processing terminal connected to the external device is known. In the information processing system, if an attaching state of the recording medium for the external device is changed, the information processing terminal indicates a notification of the change of the attaching state of the recording medium in the external device.

JP-A-2005-209288 describes one example of such information processing system. This information processing system includes a personal computer and a CD-ROM drive externally connected to the personal computer. In this information processing system, the personal computer periodically requests to the CD-ROM drive for information that indicates the attaching state of the CD-ROM. In response to the request, the CD-ROM drive transmits the information that indicates the attaching state of the CD-ROM to the personal computer. When this information is received, the personal computer notifies the user of the attaching state of the CD-ROM.

SUMMARY

In recent years, a recording medium such as a memory card including a memory device such as a flash memory, etc., is widely used. Also, network systems are advanced, and thus, many information processing terminals can be connected to a single external device (for example, a printer, a facsimile machine, and a multifunction peripheral (MFP), etc.). In the information processing system including a plurality of information processing terminals connected to the single external device, only a user of a certain information processing terminal may use a recording medium attached to the external device.

In this regard, the information processing system of JP-A-2005-209288 is configured so that a CD-ROM drive and a personal computer are connected externally on a one-to-one basis. Here, consider a case where the information processing system of JP-A-2005-209288 is applied to the information processing system including a plurality of information processing terminals connected to a single external device. In this case, if the attaching state of the recording medium in the external device is changed, all the information processing terminals connected to the external device will notify the respective users of the change of the attaching state of the recording medium.

However, as described above, there are many instances in which the users that use the recording medium are specified. That is, when the system of JP-A-2005-209288 is applied to the information processing system in which a plurality of information processing terminals are connected to a single external device, the attaching state of the recording medium is notified also to another user (i.e., another information processing terminal) who does not plan to use the recording medium. For the other user, work in the information processing terminal is disrupted by the notification.

The present invention was made in consideration of the above circumstances, and an object thereof is to provide an information processing system, an information processing terminal and a computer readable medium storing thereon a control program for an information processing terminal, which can appropriately notify information relating to the recording medium (e.g., an attaching state of the recording medium in the external device) and can perform a process regarding the recording medium.

According to an aspect of the invention, there is provided an information processing system, comprising: an external device comprising an attaching unit configured to allow a recording medium capable of recording data to be detachably attached; and a plurality of information processing terminals, each of the information processing terminals comprising a communicating unit configured to perform a data communication with the external device, wherein each of the information processing terminals comprises: a storage unit configured to store identification information unique to the information processing terminal; an obtaining unit configured to obtain media information from the external device, the media information relating to the recording medium attached to the attachment unit; a detecting unit configured to detect notification destination identification information from the media information obtained by the obtaining unit, the notification destination identification information indicating a notification destination of information relating to the recording medium; a first determining unit configured to determine whether the notification destination identification information detected by the detecting unit matches the identification information stored in the storage unit; and a notification executing unit configured to execute a notification relating to the recording medium attached to the attaching unit, if the first determining unit determines that the notification destination identification information matches the identification information.

According to another aspect of the invention, there is provided an information processing terminal, comprising: a communicating unit configured to perform a data communication with an external device that comprises an attachment unit configured to allow a recording medium capable of recording data to be detachably attached; a storage unit configured to store identification information unique to the information processing terminal; an obtaining unit configured to obtain media information from the external device, the media information relating to the recording medium attached to the attachment unit; a detecting unit configured to detect notification destination identification information from the media information obtained by the obtaining unit, the notification destination identification information indicating a notification destination of information relating to the recording medium; a first determining unit configured to determine whether the notification destination identification information detected by the detecting unit matches the identification information stored in the storage unit; and a notification executing unit configured to execute a notification relating to the recording medium attached to the attachment unit, if the first determining unit determines that the notification destination identification information matches the identification information.

According to yet another aspect of the invention, there is provided a computer readable medium storing a control program for an information processing terminal, the information processing terminal comprising: a communicating unit configured to perform a data communication with an external device that comprises an attachment unit configured to allow a recording medium capable of recording data to be detachably attached; a storage unit configured to store identification information unique to the information processing terminal; and a notifying unit configured to provide various notifications, said control program, when executed, enables the information processing terminal to execute: obtaining media information from the external device, the media information relating to the recording medium attached to the attachment unit; detecting notification destination identification information from the obtained media information, the notification destination identification information indicating a notification destination of information relating to the recording medium; determining whether the detected notification destination identification information matches the identification information stored in the storage unit, and executing a notification relating to the recording medium attached to the attachment unit, if it is determined that the detected notification destination identification information matches the identification information.

DESCRIPTION

Figure 1:
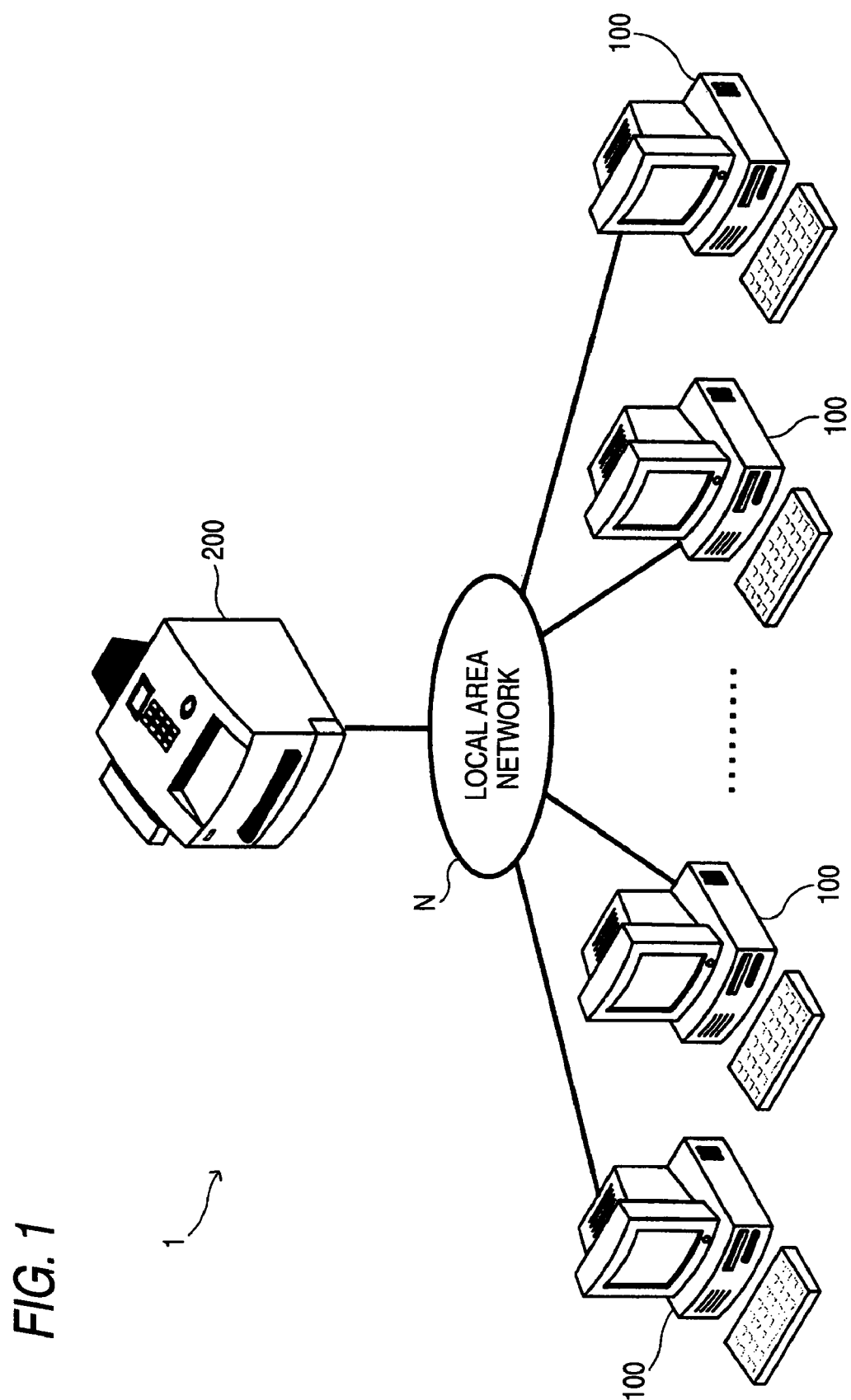
FIG. 1 is a diagram showing a schematic configuration of an information processing system according to an exemplary embodiment of the present invention.

Hereinafter, an information processing system, an information processing terminal, and a control program for the information processing terminal according to an exemplary embodiment of the present invention will be described in detail with reference to the drawings. FIG. 1 is a diagram regarding the configuration of an information processing system 1 according to the present embodiment.

As shown in FIG. 1, the information processing system 1 according to the present embodiment includes a multifunction peripheral 200 (also called "MFP") and a plurality of information processing terminals 100. Each of the information processing terminals 100 is connected to the multifunction peripheral 200 via a communication network. In this embodiment, an example of the communication network is a local area network N. The multifunction peripheral 200 includes various functions such as a photo media capturing function, a printer function, a copy function, a scanner function, and a facsimile function.

Figure 2:
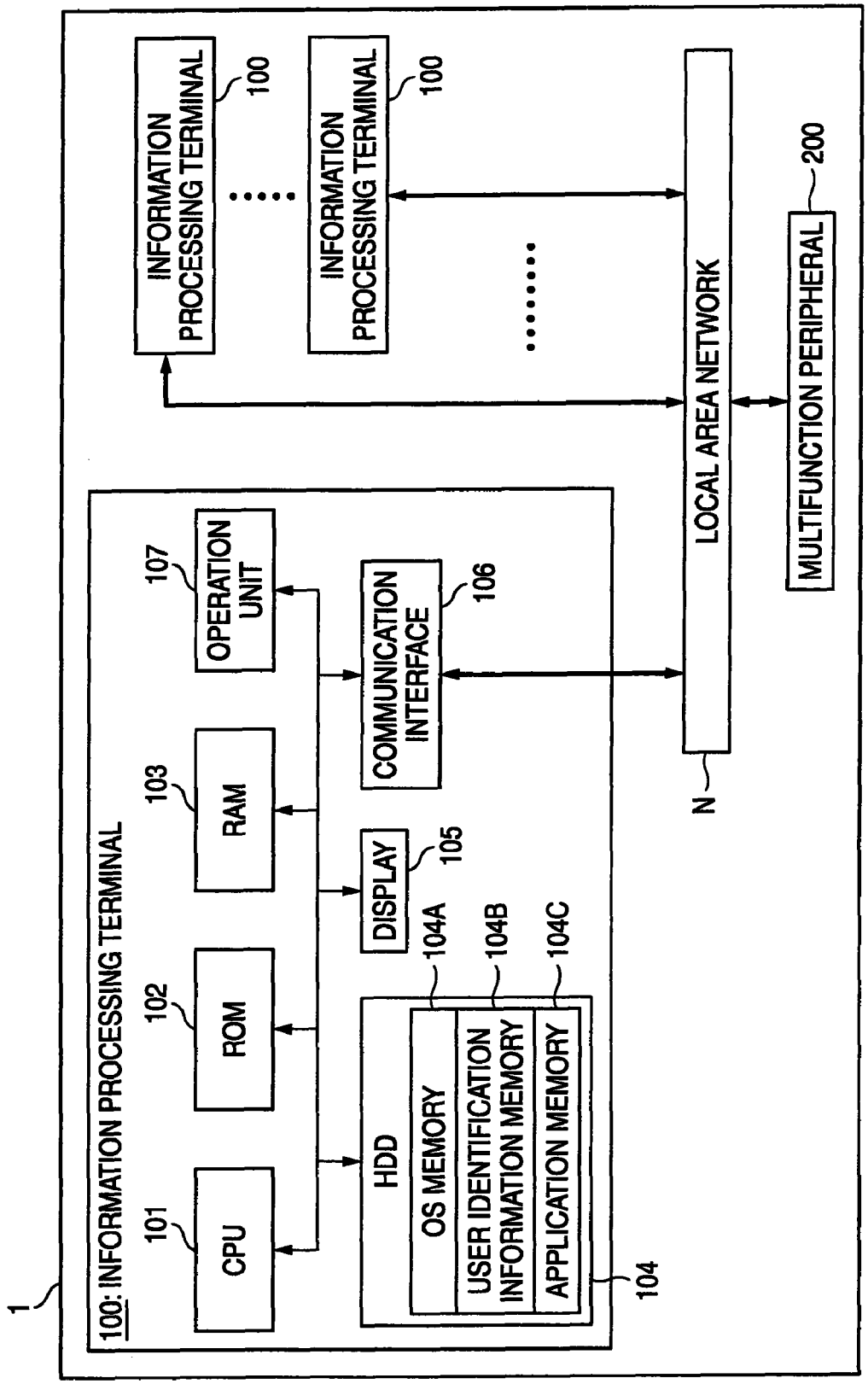
FIG. 2 is a block diagram showing the information processing system and a control system of an information processing terminal.

First, the information processing terminal 100 configuring the information processing system 1 according to the present embodiment will be described in detail with reference to the drawings. FIG. 2 is a block diagram mainly showing a control system of the information processing terminal 100.

As shown in FIG. 2, the information processing terminal 100 is provided with a CPU 101, a ROM 102, a RAM 103, and a HDD (Hard Disk Drive) 104. The CPU 101, the ROM 102, the RAM 103 and the HDD 104 configured to control the information processing terminal 100.

The CPU 101 is a central processing unit configured to execute various types of control programs at the time of controlling the information processing terminal 100. The ROM 102 is a non-rewritable memory device. The ROM 102 stores data and control programs for controlling the information processing terminal 100. As described above, the control programs stored in the ROM 102 are executed by the CPU 101. The RAM 103 temporarily stores an arithmetic result of the control program by the CPU 101, etc.

The HDD 104 is a rewritable and non-volatile memory device. The HDD 104 includes an OS memory 104A, a user identification information memory 104B, and an application memory 104C. The OS memory 104A stores an OS (Operating system) that is basic software for performing basic control of the information processing terminal 100. The user identification information memory 104B stores user identification information that indicates a user of the information processing terminal 100. The application memory 104C stores various types of application programs executed by the information processing terminal 100. In the present embodiment, as one of the application programs, a recording medium information processing program (see FIG. 7), a user confirmation control processing program (see FIG. 8), and a designated process selection processing program (see FIG. 10), described later, are stored in the application memory 104C.

In addition to the aforementioned CPU 101, etc., the information processing terminal 100 includes a display 105, an operation unit 107, and a communication interface 106. The display 105 is a display device capable of displaying various types of information. In the present embodiment, the display 105 includes a liquid crystal display. On the display 105, a user confirmation display window 70 (described later) and a designated process list window 80 can be displayed.

The communication interface 106 is an interface for connecting the information processing terminal 100 and the local area network N. As described above, the multifunction peripheral 200 configuring the information processing system 1 is also connected to the local area network N (see FIG. 1, etc.). Accordingly, data can be transmitted and received between the information processing terminal 100 and the multifunction peripheral 200 via the local area network N.

The operation unit 107 includes a keyboard having a plurality of input keys, a mouse, etc. Based on an operation signal from this operation unit 107, the CPU 101 performs control based on the operation signal. In the present embodiment, the operation unit 107 is operated by the user at the time of executing the recording medium information processing program (see FIG. 7), the user confirmation control processing program (see FIG. 8), and the designated process selection processing program (see FIG. 10), described later.

Figure 3:
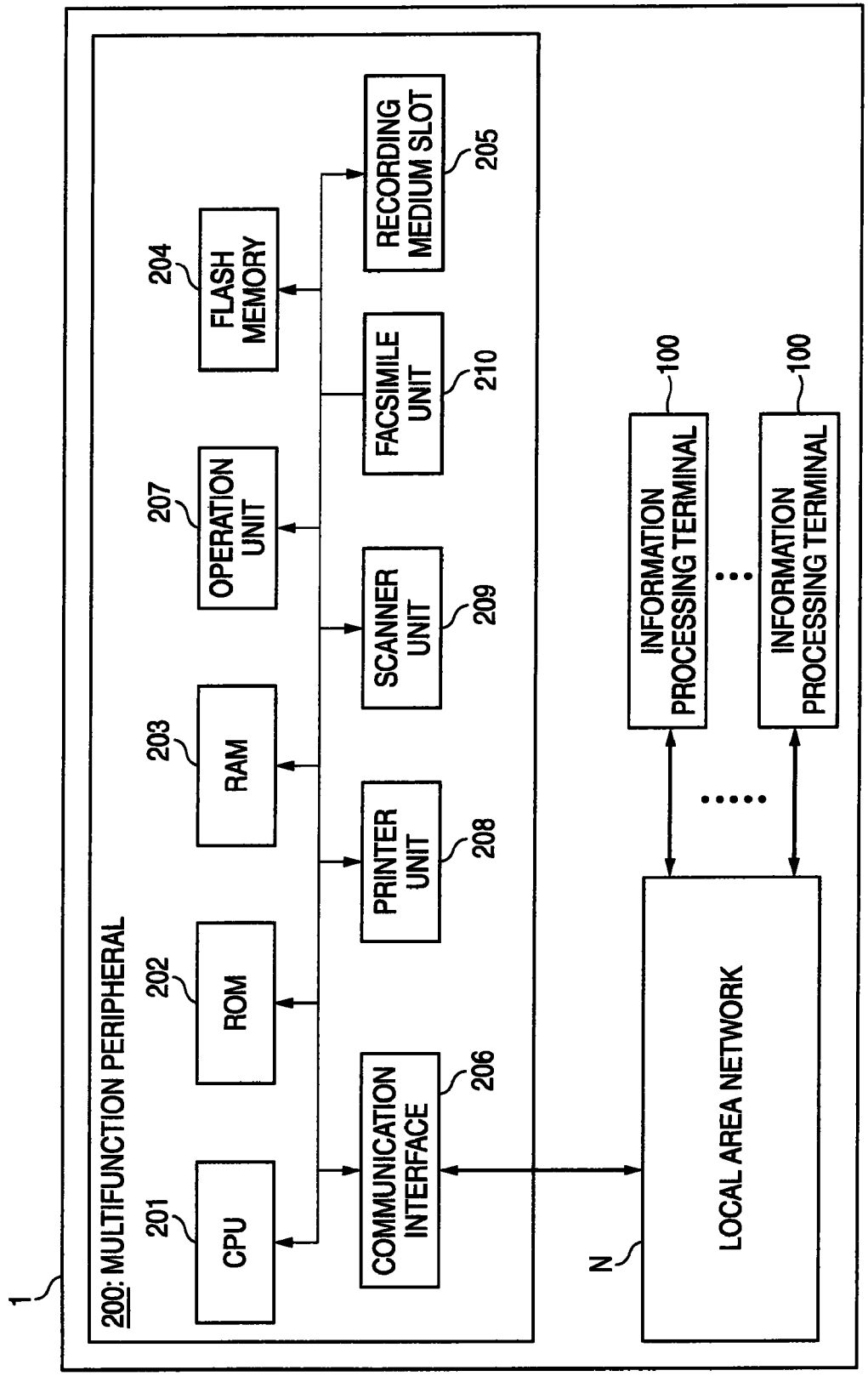
FIG. 3 is a block diagram showing the information processing system and a control system of a multifunction peripheral.

Next, the multifunction peripheral 200 configuring the information processing system 1 will be described in detail with reference to the drawings. FIG. 3 is a block diagram mainly showing a control system of the multifunction peripheral 200.

As shown in FIG. 3, the multifunction peripheral 200 includes a CPU 201, a ROM 202, a RAM 203, and a flash memory 204. The CPU 201, the ROM 202, the RAM 203, and the flash memory 204 are configured to control the multifunction peripheral 200.

The CPU 201 is a central processing unit for executing various types of control programs at the time of controlling the multifunction peripheral 200. The ROM 202 is a non-rewritable memory device. The ROM 202 stores data and control programs for controlling the multifunction peripheral 200. As described above, the control program stored in the ROM 202 is executed by the CPU 201. In the present embodiment, the ROM 202 stores a recording medium information processing program (see FIG. 6) described later.

The RAM 203 temporarily stores an arithmetic result of the control program by the CPU 201, etc. The flash memory 204 is a non-volatile memory device. The flash memory 204 can read and write data therein. In the flash memory 204, setup data, etc., related to each function that can be executed by the multifunction peripheral 200 are stored.

Further, as shown in FIG. 3, the multifunction peripheral 200 further includes a recording medium slot 205, a communication interface 206, an operation unit 207, a printer unit 208, a scanner unit 209, and a facsimile unit 210.

The recording medium slot 205 is a slot to which the recording medium 50 of various formats can be detachably attached. It is noted that the configuration of the recording medium 50 is described later. The recording medium slot 205 has functions of a recording medium reader and a recording medium writer. Accordingly, the multifunction peripheral 200 according to the present embodiment can read the data stored in the recording medium 50 attached to the recording medium slot 205. The multifunction peripheral 200 can also write data desired by the user into the recording medium 50 attached to the recording medium slot 205.

Also, the recording medium slot 205 includes a sensor (not shown) configured to detect the recording medium 50. By the detection result of this sensor, the CPU 201 can determine whether the recording medium 50 is attached to the recording medium slot 205.

The communication interface 206 is an interface which connects the multifunction peripheral 200 and the local area network N. As described above, each of the information processing terminals 100 is connected to the local area network N (see FIG. 1, etc.). Accordingly, the multifunction peripheral 200 can transmit/receive data and signals to/from each information processing terminal 100 via the local area network N.

The operation unit 207 is an example of an operating unit in which various types of user operations are performed. The operation unit 207 includes a plurality of operation input keys and a compact display. The plurality of operation input keys include a mode selection key, a numeric keypad, a cursor key, etc. The mode selection key is input and operated for selecting various functions such as a copy function, a scanner function, and a facsimile function. The numeric keypad is used for inputting numerals and characters. For example, the numeric keypad is used for inputting a destination facsimile number at the time of a facsimile transmission based on the facsimile function. The cursor key is used for selecting selection options desired by the user from among a plurality of selection options. The compact display displays a detailed setting screen (not shown), etc., that indicate a detailed setting for each function.

Based on the control signal from the CPU 201, the printer unit 208 prints a recording sheet set in a paper feeding position (not shown). In the present embodiment, the printer unit 208 includes an inkjet printer. The printer unit 208 is includes: a transfer motor (not shown) configured to transfer the recording sheet; a printing head (not shown) configured to discharge ink to the recording sheet; and a carriage motor (not shown) configured to move a carriage (not shown) on which the printing head is mounted.

It is noted that the printer unit 208 can adopt various types of printers, such as a laser printer, in which printing is done on the recording sheet by using the toner.

Based on the instructions from the CPU 201, the scanner unit 209 reads images from a document set in a reading position (not shown) so as to generate image data based on the document. When the copy function is set, the multifunction peripheral 200 prints the image data generated by the scanner unit 209 on the recording sheet by the printer unit 208. When the facsimile function is set, the multifunction peripheral 200 transmits by facsimile to a destination device (not shown) by the facsimile unit 210 described later, based on the image data generated by the scanner unit 209.

The facsimile unit 210 transmits and receives the image data via a telephone line (not shown). The facsimile unit 210 encodes the image data read by the scanner unit 209 and the image data received via the local area network N, and then transmits the encoded image data to a predetermined destination via the telephone line. The facsimile unit 210 decodes the data received via the telephone line into the image data, and prints the image data on the recording sheet by using the printer unit 208.

Figure 4:
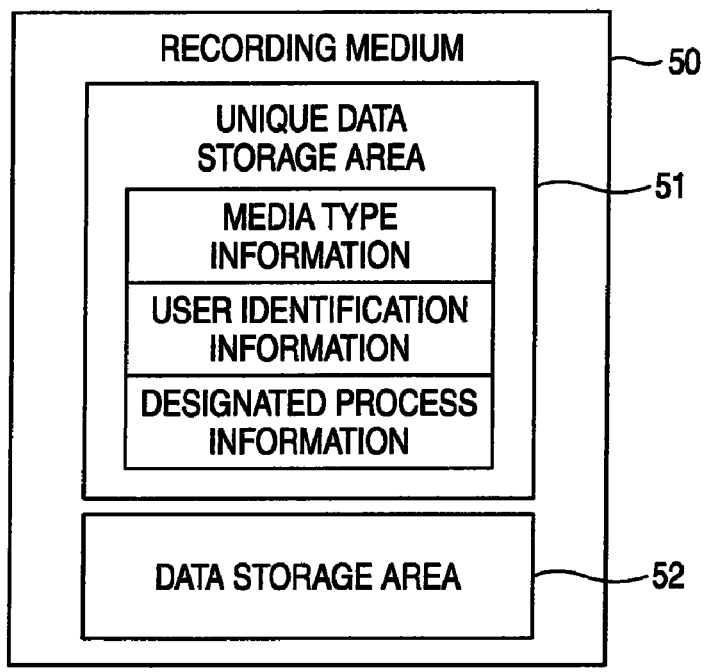
FIG. 4 is a diagram showing the configuration of a recording medium.

Subsequently, the configuration of the recording medium 50 attached to the recording medium slot 205 will be described in detail with reference to the drawings. FIG. 4 is a diagram showing a schematic configuration of the recording medium 50.

The recording medium 50 basically includes a flash memory. This flash memory is a rewritable memory device. The flash memory can retain the contents stored therein even when there is no power supply. Accordingly, the recording medium 50 can be used as a removable media capable of carrying the data, etc.

As shown in FIG. 4, the recording medium 50 includes a unique data storage area 51 and a data storage area 52 on the flash memory. The unique data storage area 51 is a storage area reserved for information unique to the recording medium 50. Specifically, the unique data storage area 51 stores media type information, user identification information, and designated process information, described later. The media type information, the user identification information, and the designated process information will be described in detail later.

The data storage area 52 is a storage area reserved for various types of data (for example, document data, image data, moving image data, and audio data, etc.) desired by the user. That is, the data storage area 52 is used for the intended use of the recording medium 50.

It is noted that there are various types of recording medium 50 depending on a difference in interfaces, etc. That is, the recording medium 50 includes a USB memory and a memory card (irrespective of a manufacturer standard). In the present embodiment, the different types of recording medium 50 are indicated as "Type A," "Type B" . . . for a sake of convenience.

Figure 5:
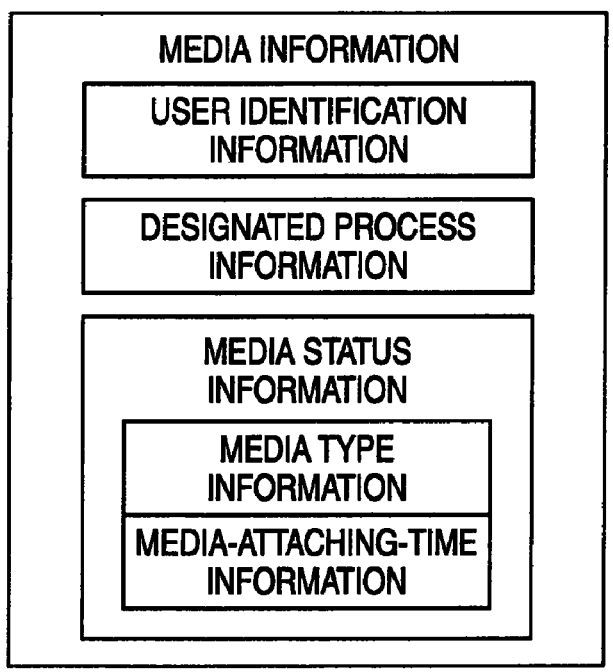
FIG. 5 is a diagram showing the configuration of media information.

At this time, media information used in the information processing system 1 according to the embodiment will be described in detail with reference to the drawings. FIG. 5 is a diagram regarding the configuration of the media information according to the present embodiment.

The information processing system 1 according to the present embodiment performs a process related to the media information between each information processing terminal 100 and the multifunction peripheral 200 based on each control processing program (see FIG. 6 to FIG. 8, and FIG. 10). The media information in the present embodiment is information related to the recording medium 50 attached to the recording medium slot 205.

As shown in FIG. 5, the media information according to the present embodiment includes user identification information, designated process information, and media status information. The user identification information is information that indicates an owner of the recording medium 50 attached to the recording medium slot 205 of the multifunction peripheral 200 and also indicates the information processing terminal 100 used by the owner. The user identification information is written into the recording medium 50 in a user identification information writing process (S8) based on a user registration signal transmitted in a user confirmation controlling process (S106), described later.

The designated process information is information that indicates a process content for various types of data stored in the data storage area 52 of the recording medium 50 attached to the recording medium slot 205. This designated process information is written into the recording medium 50 in a designated process writing process (S9) based on a process registration signal transmitted in a designated process selecting process (S111) described later.

On the other hand, the media status information is information that indicates a state of the recording medium 50 attached to the recording medium slot 205. This media status information includes media type information and media-attaching-time information. The media type information indicates types of recording medium 50 attached to the recording medium slot 205. Accordingly, when the "Type A" recording medium 50 is attached to the recording medium slot 205, the media type information is "media type: Type A." The media-attaching-time information is information that indicates a time at which the recording medium 50 is attached to the recording medium slot 205. The media-attaching-time information indicates an attaching time of the recording medium 50 as in "2007/01/23/10:54:24," for example. This attaching time information can be obtained from the multifunction peripheral 200.

It is noted that the media status information also indicates a state that the recording medium 50 is not attached to the recording medium slot 205. In this case, the media type information is "media type: NONE." At this time, the media-attaching-time information indicates "0."

Figure 6:
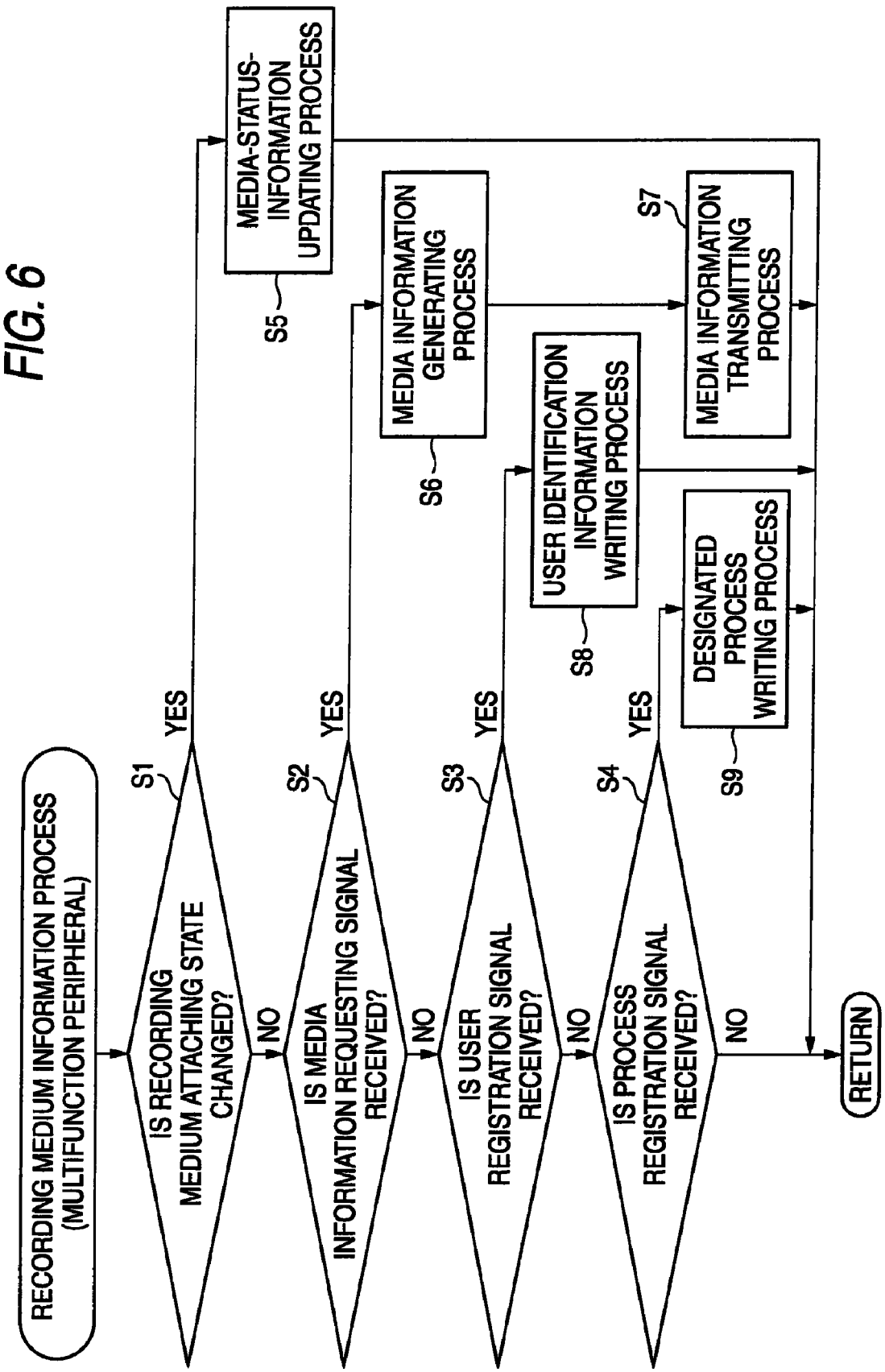
FIG. 6 is a flowchart for a recording medium information processing program executed in the multifunction peripheral.

Next, the recording medium information processing program executed by the multifunction peripheral 200 according to the present embodiment will be described in detail with reference to the drawings. FIG. 6 is a flowchart for the recording medium information processing program executed by the multifunction peripheral 200. It is noted that the recording medium information processing program is executed as a parallel process for a main control program that commands each function of the multifunction peripheral 200.

When the recording medium information processing program is started to execute, first, the CPU 201 determines whether a recording medium attaching state is changed (S1). Specifically, the CPU 201 makes the determination at S1 based on the detection signal from the sensor of the recording medium slot 205. That is, at S1, the CPU 201 determines whether the recording medium 50 is attached to the recording medium slot 205 and also determines whether the recording medium 50 is removed from the recording medium slot 205. When the recording medium attaching state is changed (S1: YES), the CPU 201 moves the process to a media-status-information updating process (S5). On the other hand, when the recording medium attaching state is not changed (S1: NO), the CPU 201 moves the process to S2.

When the process is moved to S2, the CPU 201 determines whether a media information requesting signal is received. This media information requesting signal is a signal which is transmitted from the information processing terminal 100 configuring the information processing system 1. Specifically, the media information requesting signal is transmitted to the multifunction peripheral 200 at S101 of the recording medium information processing program, described later, in the information processing terminal 100. When the media information requesting signal is received (S2: YES), the CPU 201 moves the process to a media information generating process (S6). On the other hand, when the media information requesting signal is not received (S2: NO), the CPU 201 moves the process to S3.

At S3, the CPU 201 determines whether the user registration signal is received. This user registration signal is transmitted from the information processing terminal 100 configuring the information processing system 1. Specifically, the user registration signal is transmitted to the multifunction peripheral 200 at S124 of the user confirmation control processing program described later. When the user registration signal is received (S3: YES), the CPU 201 moves the process to the user identification information writing process (S8). On the other hand, when the user registration signal is not received (S3: NO), the CPU 201 moves the process to S4.

At S4, the CPU 201 determines whether the process registration signal is received. The process registration signal is transmitted from the information processing terminal 100 in the information processing system 1. Specifically, this process registration signal is transmitted to the multifunction peripheral 200 at S135 of the designated process registration processing program described later. When the process registration signal is received (S4: YES), the CPU 201 moves the process to the designated process writing process (S9). On the other hand, when the process registration signal is not received (S4: NO), the CPU 201 ends the recording medium information processing program. In this case, the CPU 201 starts again the execution of the recording medium information processing program (see FIG. 6).

When the process is moved to S5 as a result of a change of the recording medium attaching state (S1: YES), the CPU 201 executes the media-status-information updating process. That is, corresponding to the recording medium attaching state, the CPU 201 updates the media type information and the media-attaching-time information configuring the media status information. After updating the media status information, the CPU 201 ends the recording medium information processing program.

The process content at S5 is specifically described. First, when the recording medium 50 is attached to the recording medium slot 205, the CPU 201 obtains the media type information from the unique data storage area 51 of the recording medium 50 that is newly attached. Then, the CPU 201 stores, as the media status information, the newly obtained media type information (for example, "media type: Type A") in the RAM 203. Also, the CPU 201 generates the media-attaching-time information (for example, "media attaching time: 2007/01/23/10:54:24") based on the time that is newly attached to the recording medium slot 205. The CPU 201 also stores, as the media status information, the generated media status information in the RAM 208.

On the other hand, when the recording medium 50 is removed from the recording medium slot 205, the CPU 201 generates the media type information (for example, "media type: NONE") indicating that the recording medium 50 is not attached to the recording medium slot 205. In this case, the CPU 201 generates the media-attaching-time information that indicates "media attaching time: 0." Moreover, the CPU 201 stores, as the media status information, the generated media type information and media-attaching-time information in RAM 203.

On the other hand, when the media information requesting signal is received (S2: YES) and the process is moved to S6, the CPU 201 executes the media information generating process. In the media information generating process (S6), the CPU 201 generates the media information based on the media type information, the media-attaching-time information, the user identification information, and the designated process information. Then, when the generated media information is stored in the RAM 203, the CPU 201 moves the process to a media information transmitting process (S7).

A process content of the media information generating process is specifically described. When the recording medium 50 is attached to the recording medium slot 205, the CPU 201 generates the media type information and the media-attaching-time information related to the recording medium 50 attached to the recording medium slot 205, and obtains the user identification information and the designated process information from the recording medium 50. It is noted that when the user identification information and the designated process information are not stored in the recording medium 50, the CPU 201 generates the user identification information (for example, "user identification information: NONE") and the designated process information (for example, "designated process information: NONE") which indicate that these two types of information are not stored in the recording medium 50. Then, the CPU 201 stores the media information in the RAM 203, based on the media type information, the media-attaching-time information, the user identification information, and the designated process information.

When the recording medium 50 is not attached to the recording medium slot 205, the CPU 201 stores in the RAM 203 the media information indicating that the recording medium 50 is not attached to the recording medium slot 205. In this case, the media information includes the media type information, the media-attaching-time information, the user identification information, and the designated process information that indicate "media type information: NONE," "media-attaching-time information: 0," "user identification information: NONE" and "designated process information: NONE," respectively.

When the process is moved to S7, the CPU 201 executes the media information transmitting process. In the media information transmitting process (S7), the CPU 201 reads from the RAM 203 the media information generated in the media information generating process (S6), and transmits this information to the information processing terminal 100 from which the media information requesting signal is transmitted. After the media information is transmitted to the information processing terminal 100, the CPU 201 ends the recording medium information processing program.

At S8 where the process is moved when the user registration signal is received (S3: YES), the CPU 201 executes the user identification information writing process. In the user identification information writing process (S8), the CPU 201 writes the user identification information into the recording medium 50 attached to the recording medium slot 205 based on the user registration signal transmitted from the information processing terminal 100. After writing the user identification information into the unique data storage area 51 of the recording medium 50, the CPU 201 ends the recording medium information processing program.

It is noted that the user registration signal includes the user identification information that indicates the user who has transmitted the user registration signal. That is, the user identification information included in the user registration signal indicates the same content as that of the user identification information stored in the user identification information memory 104B of the information processing terminal 100.

At S9 where the process is moved when the process registration signal is received (S4: YES), the CPU 201 executes the designated process writing process. In the designated process writing process (S9), the CPU 201 writes the designated process information into the recording medium 50 attached to the recording medium slot 205 based on the process registration signal. After writing the designated process information into the unique data storage area 51 of the recording medium 50, the CPU 201 ends the recording medium information processing program.

The process registration signal includes the information indicating the process content selected and designated in the designated process selecting process (S111) of the information processing terminal 100. Accordingly, based on the information, the CPU 201 writes the designated process information that indicates the process content designated by the user, into the unique data storage area 51 of the recording medium 50.

Figure 7:
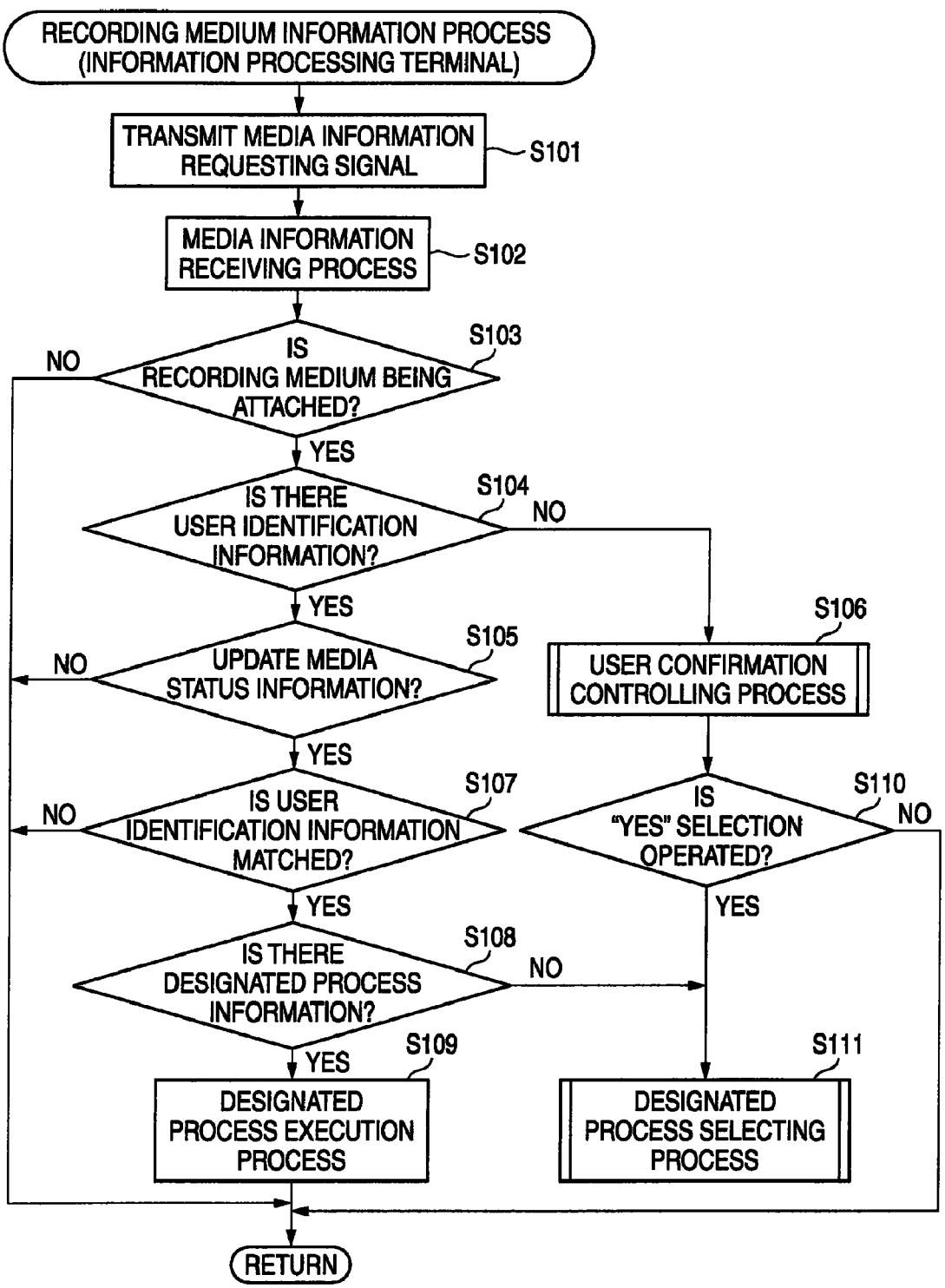
FIG. 7 is a flowchart for a recording medium information processing program executed in the information processing terminal.

Next, the recording medium information processing program executed in the information processing terminal 100 according to the present embodiment will be described in detail with reference to the drawings. FIG. 7 is a flowchart for the recording medium information processing program executed in the information processing terminal 100. It is noted that this recording medium information processing program is executed as a parallel process for an OS of the information processing terminal 100 and other application programs.

It is noted that the recording medium information processing program starts the execution, along with a startup of a status monitor program, which is one of the application programs. The recording medium information processing program is executed repeatedly when the status monitor program is being started.

When the execution of the recording medium information processing program in the information processing terminal 100 is started, first, the CPU 101 transmits the media information requesting signal to the multifunction peripheral 200 (S101). On transmitting the media information requesting signal, CPU 101 moves the process to S102.

When the process is moved to S102, the CPU 101 executes the media information receiving process. In the media information receiving process (S102), the CPU 101 receives the media information transmitted from the multifunction peripheral 200 at S7, based on the media information requesting signal. Then, when the received media information is stored into the RAM 103, the CPU 101 moves the process to S103.

At S103, the CPU 101 determines whether the recording medium 50 is attached to the multifunction peripheral 200. Specifically described, the CPU 101 makes the determination at S103 based on the media status information stored in the RAM 103. It is noted that the media status information is included in the media information received in the media information receiving process (S102). When the recording medium 50 is attached to the multifunction peripheral 200 (S103: YES), the CPU 101 moves the process to S104. On the other hand, when the recording medium 50 is not attached to the multifunction peripheral 200 (S103: NO), the CPU 101 ends the recording medium information processing program. As described above, when the status monitor program is being started, the CPU 101 immediately starts again the execution of the recording medium information processing program.

At S104, the CPU 101 determines whether the user identification information is written into the recording medium 50 attached to the recording medium slot 205. Specifically, the CPU 101 determines this writing based on whether the user identification information included in the media information received by the media information receiving process (S102) is "NONE." When the user identification information is written into the recording medium 50 (S104: YES), the CPU 101 moves the process to S105. At this time, the CPU 101 confirms whether a user confirmation display window 70, described later, is displayed on the display 105. Then, when the user confirmation display window 70 is displayed on the display 105, the CPU 101 deletes the display of the user confirmation display window 70 on the display 105. On the other hand, when the user identification information is not written into the recording medium 50 (S104: NO), the CPU 101 moves the process to the user confirmation controlling process (S106).

At S105, the CPU 101 determines whether the media status information content is updated in the received media information. That is, the CPU 101 compares the media status information that is received in the media information receiving process (S102) performed immediately preceding S105 with the media status information received immediately preceding that. It is noted that the two pieces of media status information are stored in the RAM 103. That is, the RAM 103 stores at least two batches of media information and holds its storage content (i.e., the media information content). When the media status information content is updated (S105: YES), the CPU 101 moves the process to S107. On the other hand, when the media status information content is not changed (S105: NO), the CPU 101 ends the recording medium information processing program.

When the process is moved to S107, the CPU 101 determines whether the user identification information received in the immediately preceding media information receiving process (S102) matches the user identification information immediately preceding that. As described above, the media information this time and the media information immediately preceding that are stored in the RAM 103. Accordingly, the CPU 101 can make the determination at S107 by referring to the RAM 103. When the user identification information matches (S107: YES), the CPU 101 moves the process to S108. On the other hand, when the user identification information differs (S107: NO), the CPU 101 ends the media information processing program.

At S108, the CPU 101 determines whether the designated process information is written into the recording medium 50 attached to the multifunction peripheral 200. That is, the CPU 101 makes the determination at S108 based on whether the designated process information of the received media information is "NONE." When the designated process information is written (S108: YES), the CPU 101 moves the process to the designated process execution process (S109). On the other hand, when the designated process information is not written (S108: NO), the CPU 101 moves the process to the designated process selecting process (S111).

When the process is moved to S109, the CPU 101 executes the designated process execution process. In the designated process execution process (S109), first, the CPU 101 displays on display 105 a designated process list window 80 described later. Then, when a certain period of time (for example, five seconds) elapses from the display of the designated process list window 80 on the display 105, the CPU 101 automatically deletes the display of the designated process list window 80. By displaying the designated process list window 80 for a predetermined period prior to the process execution, the user can confirm the process contents (i.e., the process contents which are regulated by the designated process information) executed in the designated process execution process (S109). Thereafter, the CPU 101 executes a process (for example, a slide show display process, and a printing process, etc.) of the process contents regulated by the designated process information, on the data stored in the data storage area 52 of the recording medium 50 attached to the multifunction peripheral 200. A control content on each process is already well known, and thus, the description is omitted. When the designated process execution process is ended, the CPU 101 ends the recording medium information processing program.

It is noted that in the present embodiment, the designated process list window 80 is displayed on the display 105 during the designated process execution process (S109). However, the present invention is not limited to this mode. That is, it is also possible to configure such that in the designated process execution process (S109), the process based on the designated process information is executed without displaying the designated process list window 80 on the display 105.

At this time, a process where the user identification information is not written into the recording medium 50 attached to the multifunction peripheral 200 will be described.

As described above, when the user identification information is not written into the recording medium 50 (S104: NO), the CPU 101 executes the user confirmation controlling process (S106). In the user confirmation controlling process (S106), the CPU 101 executes the user confirmation control processing program. According to the user confirmation control processing program, the CPU 101 executes the process related to a registration of the user identification information for the recording medium 50 attached to the multifunction peripheral 200. At this time, the CPU 101 displays the user confirmation display window 70 on the display 105 (see FIG. 9). When the user confirmation controlling process is ended, the CPU 101 moves the process to S110. It is noted that the user confirmation controlling process will be described in detail later.

At S110, the CPU 101 determines whether an operation for the selection option "YES" of the user confirmation display window 70 is performed. Specifically, the CPU 101 makes the determination at S110 based on an operation signal from the operation unit 107. When the operation for the selection option "YES" of the user confirmation display window 70 is performed (S110: YES), the CPU 101 moves the process to S111. On the other hand, when the operation for the selection option "YES" of the user confirmation display window 70 is not performed (S110: NO), the CPU 101 ends the recording medium information processing program. It is noted that a case that the operation for the selection option "YES" is not performed includes a case that no operation is performed, in addition to a case that the selection operation for the selection option "NO" is performed.

At subsequent S111, the CPU 101 executes the designated process selecting process. In the designated process selecting process (S111), the CPU 101 executes the designated process selection processing program described later. According to the designated process selection processing program, the CPU 101 performs the process related to the process contents for the data stored in the data storage area 52 of the recording medium 50 attached to the multifunction peripheral 200. Specifically, the CPU 101 displays the designated process list window 80, described later, on the display 105, and accepts the selection of the process contents desired by the user. The CPU 101 also performs a process for registering the designated process information related to the process contents desired by the user, on the recording medium 50 attached to the multifunction peripheral 200. When the designated process selecting process (S111) is ended, the CPU 101 ends the recording medium information processing program It is noted that the designated process selecting process (S111) will be described in detail with reference to the drawings later.

The aforementioned designated process selecting process (S111) is also executed when the designated process information is not written to the recording medium 50 attached to the multifunction peripheral 200 (S108: NO) in addition to when the operation for the selection option "YES" of the user confirmation display window 70 is performed (S110: YES) in the user confirmation controlling process (S106).

Figure 8:
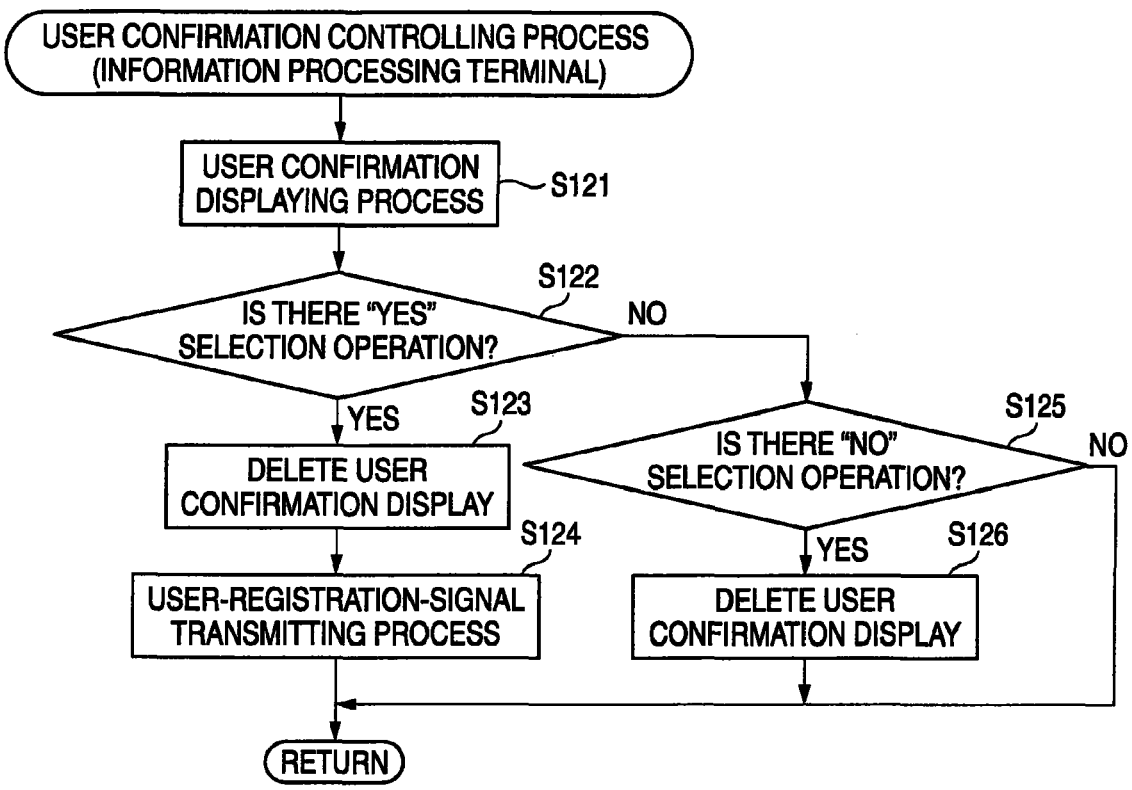
FIG. 8 is a flowchart for a user confirmation control processing program.

Next, the user confirmation control processing program executed on the information processing terminal 100 will be described in detail with reference to the drawings. FIG. 8 is a flowchart for the user confirmation control processing program.

As shown in FIG. 8, when the process is moved to the user confirmation controlling process (S106), first, the CPU 101 executes a user confirmation displaying process (S121). In the user confirmation displaying process (S121), the CPU 101 displays on display 105 the user confirmation display window 70 shown in FIG. 9. After displaying the user confirmation display window 70 on the display 105, the CPU 101 moves the process to S122.

Figure 9:
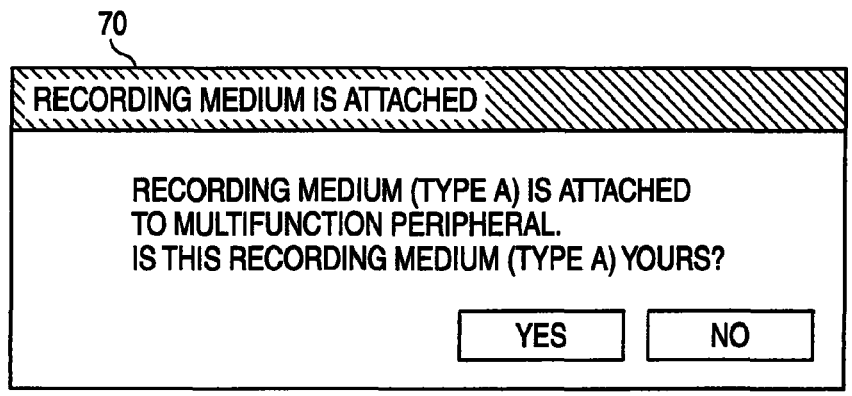
FIG. 9 is a diagram showing a display example of a user confirmation display window.

At this time, the user confirmation display window 70 will be described with reference to the drawings. As shown in FIG. 9, the user confirmation display window 70 includes a confirmation message, a selection option "YES," and a selection option "NO." The confirmation message is a message to the effect of "owner of the recording medium 50 attached to the multifunction peripheral 200 is inquired." Then, the confirmation message is generated based on the media type information obtained in the media information receiving process (S102). That is, the confirmation message is expressed in a mode which specifies the types (for example, type A, etc.) of the recording medium 50 attached to the multifunction peripheral 200. The selection option "YES" is operated when the user of the information processing terminal 100 is the owner of recording medium 50 attached to the multifunction peripheral 200. On the other hand, the selection option "NO" is operated when the user of the information processing terminal 100 is not the owner of recording medium 50 attached to the multifunction peripheral 200.

After the user confirmation displaying process (S121) is performed, the CPU 101 determines whether the operation (hereinafter, referred to as "YES" selection operation) for the selection option "YES" is performed (S122). Specifically, the CPU 101 makes the determination at S122 based on the operation signal from the operation unit 107. When the "YES" selection operation is performed (S122: YES), the CPU 101 moves the process to S123. On the other hand, when the "YES" selection operation is not performed (S122: NO), the CPU 101 moves the process to S125.

When the "YES" selection operation is performed and the process is moved to S123, first, the CPU 101 deletes the user confirmation display window 70 on the display 105. Thereafter, the CPU 101 executes a user-registration-signal transmitting process based on the "YES" selection operation by the user (S124). In the user-registration-signal transmitting process (S124), first, the CPU 101 generates the user registration signal, and transmits the user registration signal to the multifunction peripheral 200. That is, the CPU 101 reads the user identification information stored in the user identification information memory 104B. Then, the CPU 101 combines a signal that instructs to write as the user identification information and the read user identification information, in the unique data storage area 51 of the recording medium 50 so as to generate the user registration signal. When the generated user registration signal is transmitted to the multifunction peripheral 200, the CPU 101 ends the user confirmation control processing program.

At S125 where the process is moved when the "YES" selection operation is not performed, the CPU 101 determines whether the operation (hereinafter, referred to as "NO" selection operation) for the selection option "NO" is performed. Specifically, the CPU 101 makes the determination at S125 based on the operation signal from the operation unit 107. When the "NO" selection operation is performed (S125: YES), the CPU 101 deletes the display of the user confirmation display window 70 on the display 105 (S126). After the display of the user confirmation display window 70 is deleted, the CPU 101 ends the user confirmation control processing program. On the other hand, when the "NO" selection operation is not performed (S125: NO), the CPU 101 ends the user confirmation control processing program. That is, when no operation is performed on the user confirmation display window 70, the display 105 maintains a state that the user confirmation display window 70 is displayed.

It is noted that when the user registration signal is transmitted to the multifunction peripheral 200 from either one of the information processing terminals 100 in the information processing system 1, the user identification information related to the information processing terminal 100 is written into the recording medium 50. In such an instance, the user identification information will exist in the recording medium 50 (S104: YES). In this case, in the other information processing terminals 100, the CPUs 101 in the other information processing terminals 100 delete the display of the user confirmation display window 70 on the display 105 (S104: YES). That is, when either one of the information processing terminals 100 configuring the information processing system 1 transmits the user registration signal, the display of the user confirmation display windows 70 in the other information processing terminals 100 is deleted.

Figure 10:
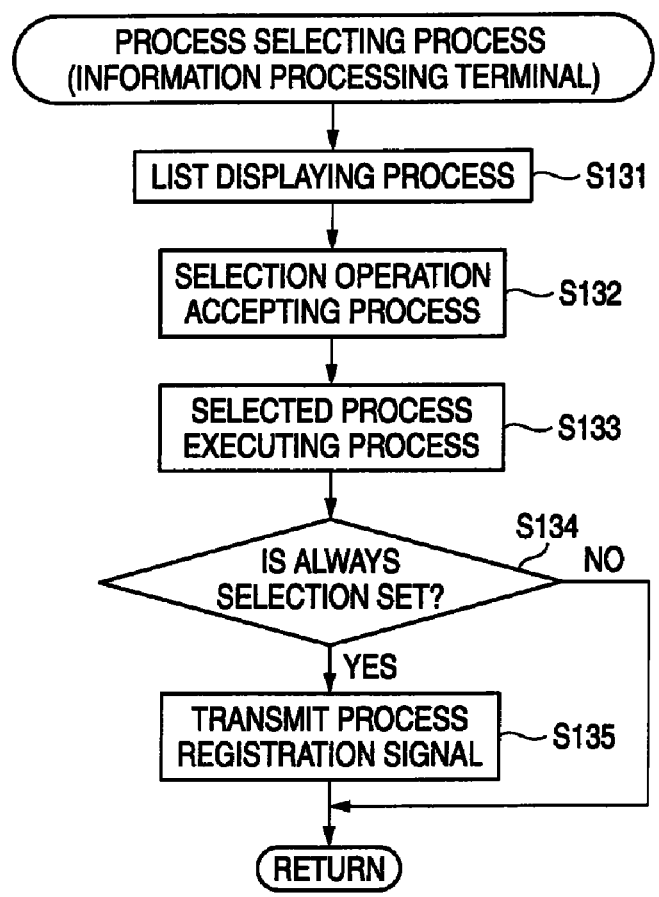
FIG. 10 is a flowchart for a designated process selection processing program.

Next, the designated process selection processing program executed in the information processing terminal 100 will be described in detail with reference to the drawings. FIG. 10 is a flowchart for the designated process selection processing program.

As shown in FIG. 10, when the process is moved to the designated process selecting process (S111), first, the CPU 101 executes a list displaying process (S131). In the list displaying process (S131), the CPU 101 displays on the display 105 the designated process list window 80 shown in FIG.

11. After displaying the designated process list window 80 on the display 105, the CPU 101 moves the process to S132.

Figure 11:
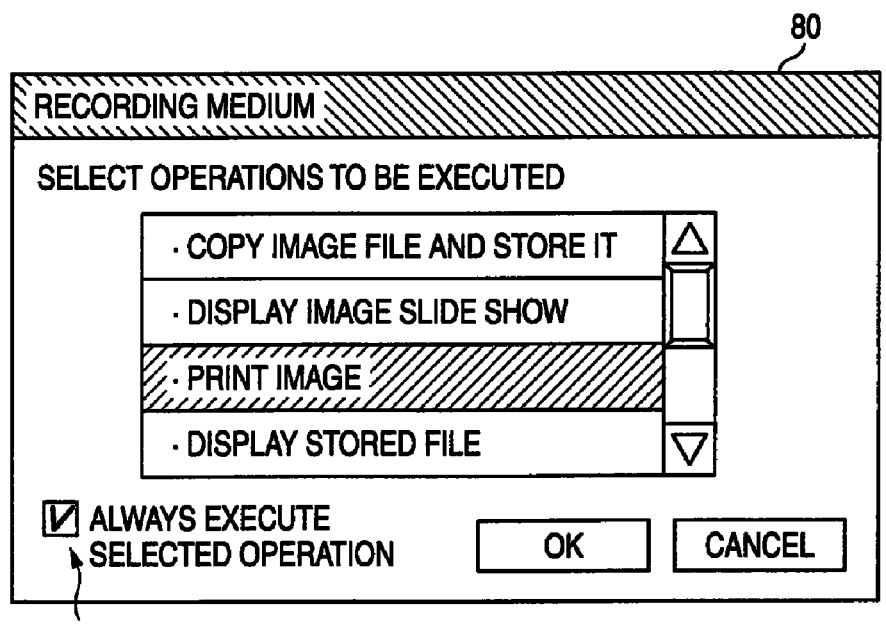
FIG. 11 is a diagram showing a display example of a designated process list window.

At this time, the designated process list window 80 will be described with reference to the drawings. As shown in FIG. 11, the designated process list window 80 includes a designated process list displaying portion, a selection option displaying portion, and an always selection displaying portion 81. The designated process list displaying portion displays a list of process contents which can be executed for the data stored in the data storage area 52 of the recording medium 50 attached to the recording medium slot 205 (see FIG. 11). The user can select a desired process content from the process contents (for example, a slide show display and printing of the data stored in the data storage area 52, etc.) displayed in the designated process list displaying portion. The selection option displaying portion is used at the time of finalizing the selection of the process content desired by the user from the process contents displayed in the designated process list displaying portion. In the example shown in FIG. 11, the selection option displaying portion includes buttons indicating "YES" and "NO." Further, the always selection displaying portion 81 is used to set the finally selected process content by the operation for the selection option display to a process content always executed when the recording medium 50 is attached. As shown in FIG. 11, the always selection displaying portion 81 includes a checkbox. An always selection setting can be enabled by inputting a check in the checkbox.

When the process is moved to S132, the CPU 101 executes a selection operation accepting process. In the selection operation accepting process (S132), based on the operation signal from the operation unit 107, the CPU 101 accepts a user operation for the selection option displaying portion and the always selection displaying portion 81 in the designated process list window 80. When the selection operation accepting process (S132) is ended, the CPU 101 moves the process to S133.

When the process is moved to S133, the CPU 101 executes a selected process executing process. In the selected process executing process (S133), the CPU 101 executes a process on the data stored in the data storage area 52 of the recording medium 50 based on the process contents selected by the user in the selection operation accepting process (S132). For example, when "printing process (i.e., "Print image" in FIG. 11)" is selected in the selection operation accepting process (S132), the CPU 101 prints the image data stored in the data storage area 52 of the recording medium 50 attached to the recording medium slot 205. When the selected process executing process (S133) is ended, the CPU 101 moves the process to S134.

At S134, the CPU 101 determines whether the operation for the always selection displaying portion 81 (hereinafter, referred to as always selecting setting operation) in the selection operation accepting process (S132) is performed. When the always selecting setting operation is performed (S134: YES), the CPU 101 moves the process to S135. On the other hand, when the always selecting setting operation is not performed (S134: NO), the CPU 101 ends the designated process selection processing program.

When the process is moved to S135, the CPU 101 transmits the process registration signal to the multifunction peripheral 200. This process registration signal is selected in the selection operation accepting process (S132), and includes a process content in which the always selecting setting operation is performed and an instruction for writing, as the designated process information, the process content into the unique data storage area 51 of the recording medium 50 attached to the recording medium slot 205. After transmitting the process registration signal to the multifunction peripheral 200, the CPU 101 ends the designated process selection processing program.

As described above, according to the information processing system 1, the information processing terminal 100, and the control program for the information processing terminal 100 according to the present embodiment, the information processing terminal 100 detects whether the user identification information is included in the media information related to the recording medium 50 attached to the multifunction peripheral 200 (S104). When the user identification information related to the information processing terminal 100 is included in the media information (S107: YES), the information processing terminal 100 specifies that the user related to the information processing terminal 100 is the owner of the recording medium 50. Then, the information processing terminal 100 notifies (displays the designated process list window 80, for example) regarding the data stored in the data storage area 52 of the recording medium 50 (S109, S111). The other information processing terminals 100 having the user identification information which is different from the user identification information included in the media information are not provided the notification about the recording medium 50. Accordingly, the information processing system 1, the information processing terminal 100, and the control program for the information processing terminal 100 notify only the information processing terminal 100 which requires notification, and thus, the notification about the recording medium 50 can be appropriately provided.

In the information processing system 1, the information processing terminal 100 provides a notification about the recording medium 50 attached to the multifunction peripheral 200 when the media status information is updated (S105: YES). That is, when the state of the recording medium 50 in the multifunction peripheral 200 is changed and the user needs to comprehend the change, the notification about the recording medium 50 is provided. Accordingly, the information processing system 1 and the information processing terminal 100 can provide the notification (display the designated process list window 80, etc., for example) about the recording medium 50 at the appropriate moment according to necessity. When the state of the recording medium 50 is the same, the information processing terminal 100 will not provide the notification. Accordingly, in the information processing system 1 and the information processing terminal 100, with respect to the notification about the recording medium 50, it is possible to prevent the same content from being repeatedly notified.

The designated process list displaying portion is displayed in the designated process list window 80. The designated process list displaying portion displays a list of the process contents which can be executed on the data stored in the recording medium 50 attached to the multifunction peripheral 200. The user can operate the operation unit 107 so as to select the desired process content from the process contents displayed in the designated process list displaying portion. As a result, the information processing system 1 and the information processing terminal 100 can provide the user with the convenience that "the desired process content on the data can be executed without performing complicated operations." The process on the data is executed by the process content selected by the operation fox the designated process list window 80, and thus, the user can quickly obtain the process result regarding the data, which can improve work efficiency.

In the information processing system 1, the information processing terminal 100 displays the user confirmation display window 70 (S121) when the user identification information is not written into the recording medium 50 (S104: NO). That is, when the recording medium 50 of which the owner cannot be specified is attached to the multifunction peripheral 200, the user confirmation display window 70 is displayed in each information processing terminal 100 configuring the information processing system 1. Accordingly, by the user confirmation display window 70, the user of each information processing terminal 100 can comprehend that the recording medium is attached to an external device. The confirmation message is included in the user confirmation display window 70, and thus, the user is able to comprehend that the recording medium 50 of which the user cannot be specified is attached to the multifunction peripheral 200 while the information processing terminal 100 is being operated or when the user is close to that.

In the information processing system 1, when the user can use the operation unit 107 so as to perform a selection operation of the selection option "YES" on the user confirmation display window 70 (S122: YES), the registration of the user identification information for the recording medium 50 attached to the multifunction peripheral 200 can be performed (S124, S8). Accordingly, when the recording medium 50 on which the user identification information is thus registered is attached again to the multifunction peripheral 200, the information processing system 1 and the information processing terminal 100 can be configured to provide the notification for the recording medium 50 to only the information processing terminal 100 related to the user. As a result, the information processing system 1 and the information processing terminal 100 can appropriately provide the notification about the recording medium 50 when the recording medium 50 is thereafter attached to the multifunction peripheral 200.

According to the information processing system 1 and the information processing terminal 100, the information processing terminal 100 continuously and regularly executes the recording medium information processing program including when the user confirmation display window 70 is displayed on the display 105. That is, the information processing terminal 100 regularly obtains the media information from the multifunction peripheral 200 (S101, S102). Accordingly, at the point of time when there is a change in the media information content, the user can obtain the notification about the recording medium 50. Regarding the display of the user confirmation display window 70, etc., various responses can be taken without need of operation by the user.

When the user identification information included in the media information differs from the user identification information related to the corresponding information processing terminal 100 (S107: NO), the information processing terminal 100 will not execute the user confirmation controlling process (S106). That is, in this case, the user confirmation display window 70 will not be displayed on the display 105. When the user confirmation display window 70 is displayed, the user confirmation display window 70 is deleted (S107: YES). As a result, at a point when the user identification information regarding a certain information processing terminal 100 configuring the information processing system 1 is registered in the recording medium 50, the display of the user confirmation display windows 70 in the other information processing terminals 100 is automatically deleted without intervention through user operation. Accordingly, the information processing system 1 and the information processing terminal 100 will not request unnecessary operations for the user confirmation display window 70, to the user who is not related to the recording medium 50, and thus, the work in the information processing terminal 100 of the user is not disrupted. As a result, the information processing system 1 and the information processing terminal 100 can improve work efficiency of each user in the entire information processing system 1.

Further, when the always selecting setting operation of the user is performed for the designated process list window 80 displayed on the display 105 in the information processing system 1, the designated process information based on the process content selected by the user is written into the unique data storage area 51 of the recording medium 50. As a result, thereafter, when the recording medium 50 is attached to the multifunction peripheral 200, a process for the data of the recording medium 50 is executed based on the designated process information that is obtained as the media information (S109). That is, in this case, after the designated process information has been registered, the information processing system 1 and the information processing terminal 100 can execute the desired process content without intervention through user operation. As a result, the information processing system 1 and the information processing terminal 100 can alleviate the workload of the user in this case.

As described above, although the present invention has been described based on the embodiment, it is not limited merely to the aforementioned embodiment. It can be easily presumed that the present invention can be variously improved and modified within a range that does not depart from the spirit of the present invention.

For example, the configuration of the information processing system 1 is not limited to the mode in the aforementioned embodiment. That is, the information processing system 1 can also be configured by a plurality of information processing terminals 100 and a plurality of multifunction peripherals 200. Further, the information processing system 1 can also be configured by a single information processing terminal 100 and a single multifunction peripheral 200.

It is further preferable that the information processing system 1 be configured by a plurality of information processing terminals and a single external device connected to these terminals. That is, the external device configuring the information processing system 1 is not limited to the multifunction peripheral 200 as in the present embodiment. For example, the external device configuring the information processing system 1 includes various devices as long as they can be attached with the recording medium 50 such as a printer and a facsimile machine.

According to the above-described embodiments of the invention, the following information processing system, information processing terminal, and computer readable medium are provided.

(1) An information processing system comprises: an external device provided with an attaching unit attached with a recording medium capable of recording various data; and a plurality of information processing terminals each provided with a communicating unit configured to transmit and receiving data with the external device, wherein the information processing terminals each include: a storage unit configured to store identification information unique to the information processing terminal; an obtaining unit configured to obtaining media information about the recording medium attached to the attaching unit, from the external device; a detecting unit configured to detect whether notification destination identification information indicating a notification destination of the information about the recording medium is included in the media information, when the media information is obtained by the obtaining unit; a determining unit configured to determine whether the notification destination identification information detected by the detecting unit matches the identification information stored in the storage unit, when it is detected by the detecting unit that the notification destination identification information is included in the media information; and a notification executing unit configured to execute a notification about the recording medium attached to the attaching unit, when it is determined that the notification destination identification information detected by the determining unit matches the identification information stored in the storage unit.

(2) In the information processing system of the item (1), each of the information processing terminals may comprise: a holding unit configured to hold the media information obtained by the obtaining unit; a determining unit configured to determine whether media information newly obtained by the obtaining unit differs from most recent media information held in the holding unit; and a notification controlling unit configured to control the notification executing unit so that the notification about the recording medium attached to the attaching unit is executed, when it is determined by the determining unit that the media information newly obtained by the obtaining unit differs from the most recent media information held in the holding unit.

(3) In the information processing system of the item (1) or (2), each of the information processing terminals may comprise a displaying unit configured to display various information, and the notification executing unit may display on the displaying unit a selection screen on which a process executed on the data stored in the recording medium can be selected.

(4) In the information processing system of any of the items (1) to (3), the notification controlling unit may control the notification executing unit so that a destination request notification that requests an input of the notification destination identification information for the recording medium related to the media information is executed, when it is detected by the detecting unit that the notification destination identification information is not included in the media information.

(5) In the information processing system of the item (4), each of the information processing terminals may comprise: a displaying unit configured to display various information; an operating unit that is operated by a user; and an instructing unit configured to transmit various instructions to the external device via the communicating unit. The notification executing unit may provide the destination request notification by displaying on the displaying unit a confirmation message confirming whether or not the user of the information processing terminal is an owner of the recording medium and a response instructing portion allowing an input whether the user of the information processing terminal is the owner of the recording medium. The instructing unit may transmit to the external device via the communicating unit a first write instruction instructing to write identification information stored in the storage unit into the recording medium as the notification destination identification information, when the input to the response instruction portion by the operation of the operating unit indicates that the user of the information processing terminal is the owner of the recording medium. The external device may comprise: a writing unit configured to write predetermined information into the recording medium; and a write controlling unit configured to control the writing unit so that the identification information is written into the recording medium as the notification destination identification information, when the first write instruction is received.

(6) In the information processing system of the item (5), each of the information processing terminals may comprise an obtaining controlling unit configured to control the obtaining unit so that obtaining of the media information from the external device is regularly executed, when the confirmation message and the response instructing portion are displayed on the displaying unit.

(7) In the information processing system of the item (6) when the confirmation message and the response instructing portion are displayed on the displaying unit, under conditions that the media information obtained by the obtaining unit includes the notification destination identification information and that the notification destination identification information differs from the identification information stored in the storage unit, the notification controlling unit may control the notification executing unit so that the display of the confirmation message and the response instructing portion displayed on the displaying unit is deleted.

(8) In the information processing system of any of the items (5) to (7), the notification controlling unit may control the notification executing unit so that the selection screen is displayed on the displaying unit, when the input to the response instructing portion by the operation of the operating unit indicates that the user of the information processing terminal is the owner of the recording medium.

(9) In the information processing system of the item (8), each of the information processing terminal may comprise a process content specifying unit configured to specify a process content executed on data stored in the recording medium, from process contents displayed on the selection screen, based on an operation by a user for the selection screen. The instructing unit may transmit a second write instruction instructing to write process content designating information indicating the process content specified by the process content specifying unit into the recording medium, to the external device via the communicating unit. The write controlling unit may control the writing unit such that the process content designating information is written into the recording medium as the media information, when the second write instruction is received.

(10) An information processing terminal comprises: a communicating unit configured to transmit/receive data to/from an external device provided with an attaching unit to which a recording medium capable of recording various data is detachably attached; a storage unit configured to store identification information unique to the information processing terminal; an obtaining unit configured to obtain media information about the recording medium attached to the attaching unit, from the external device; a detecting unit configured to detect whether notification destination identification information indicating a notification destination of the information about the recording medium is included in the media information, when the media information is obtained by the obtaining unit; a determining unit configured to determine whether the notification destination identification information detected by the detecting unit matches the identification information stored in the storage unit, when it is detected by the detecting unit that the notification destination identification information is included in the media information; and a notification executing unit configured to execute a notification about the recording medium attached to the attaching unit, when it is determined that the notification destination identification information detected by the determining unit matches the identification information stored in the storage unit.

(11) The information processing terminal of the item (10) may further comprise: a holding unit configured to hold the media information obtained by the obtaining unit; a determining unit configured to determine whether media information newly obtained by the obtaining unit differs from most recent media information held in the holding unit; and a notification controlling unit configured to control the notification executing unit so that the notification about the recording medium attached to the attaching unit is executed, when it is determined by the determining unit that the media information newly obtained by the obtaining unit differs from the most recent media information held in the holding unit.

(12) The information processing terminal of the item (10) or (11) may further comprise a displaying unit configured to display various information. The notification executing unit may display on the displaying unit a selection screen on which a process executed on the data stored in the recording medium can be selected.

(13) In the information processing terminal of any of the items (10) to (12), the notification controlling unit may control the notification executing unit so that a destination request notification that requests an input of the notification destination identification information for the recording medium related to the media information is executed, when it is detected by the detecting unit that the notification destination identification information is not included in the media information.

(14) A computer readable medium stores a control program for an information processing terminal. The information processing terminal comprises a communicating unit configured to transmit/receive data to/from an external device provided with an attaching unit to which a recording medium capable of recording various data is detachably attached; a storage unit configured to store identification information unique to the information processing terminal; and a notifying unit configured to provide various notifications. The control program, when executed, enables the information processing terminal to execute: obtaining media information about the recording medium attached to the attaching unit, from the external device; detecting whether notification destination identification information indicating a notification destination of the information about the recording medium is included in the media information, when the media information is obtained; determining whether the detected notification destination identification information matches the identification information stored in the storage unit, when it is detected that the notification destination identification information is included in the media information; and executing a notification about the recording medium attached to the attaching unit, when it is determined that the detected notification destination identification information matches the identification information stored in the storage unit.

(15) In the computer readable medium of the item (14), the control program may enable the information processing terminal to execute: executing a destination request notification that requests an input of the notification destination identification information for a recording medium related to the media information, when it is detected that the notification destination identification information is not included in the media information.

The information processing system of the item (1) includes an external device provided with an attaching unit and a plurality of information processing terminals. Each of the information processing terminals obtains the media information about a recording medium attached to the attaching unit from the external device. The information processing terminal detects whether notification destination identification information is included in the obtained media information. When the detected notification destination identification information matches the identification information unique to the information processing terminal, the information processing terminal specifies that a user is an owner of the recording medium attached to the attaching unit of the external device and provides a notification about the recording medium. Therefore, of a plurality of information processing terminals in the information processing system, only the information processing terminal in which the notification destination identification information matches the identification information provides the notification about the recording medium. As a result, the user who uses the recording medium can reliably comprehend the notification content via the information processing terminal. Also, the other information processing terminals in which the notification destination identification information does not match the identification information will not disrupt a user's work by the notification about the recording medium. Therefore, the information processing system can appropriately provide the notification about the recording medium.

In the information processing system of the item (2), each of the information processing terminals determines whether the most recent media information held by the holding unit differs from the media information newly obtained by the obtaining unit. That is, the information processing terminal determines whether there is a change in the media information. When there is a change in the media information, the information processing terminal provides the notification about the recording medium. That is, when the media information is changed and as a result, there occurs a need for the user to comprehend the change, the information processing system provides the notification. Consequently, the information processing system can provide the notification about the recording medium at the appropriate moment according to necessity. Also, the information processing system can prevent the repeated provision of the notification about the recording medium indicating the same content.

The information processing system of the item (3) displays a selection screen as the notification about the recording medium in the information processing terminals. The selection screen displays a process executed on data stored in the recording medium in a selectable manner. As a result, the user can immediately select the process content on the data stored on the recording medium. That is, the information processing system can provide the convenience that the process content desired by the user can be executed on the data in the recording medium attached to the external device, without performing complicated operations.

In the information processing system of the item (4), each of the information processing terminals provides a destination request notification when the notification destination identification information is not included in the media information. That is, when the notification destination of the notification about the recording medium cannot be specified (that is, when the owner of the recording medium cannot be specified), the destination request notification is provided to all the information processing terminals configuring the information processing system. As a result, according to the information processing system, the user can comprehend that the recording medium is attached to the external device by the destination request notification. As a result, the information processing system can prevent a state that the recording medium is attached to the external device and left as it is. Also, the destination request notification is a notification for requesting an input of the notification destination identification information for the recording medium. Therefore, according to the information processing system, the user can comprehend near the information processing terminal that the recording medium of which the owner cannot be specified based on the notification destination identification information is attached to the external device.

In the information processing system of the item (5), each of the information processing terminals displays on the displaying unit a confirmation message and a response instructing portion as the destination request notification. Therefore, the user can operate the operating unit based on the confirmation message and the response instructing portion. That is, in the information processing system, the user can appropriately perform an operation for the destination request notification.

Each of the information processing terminals transmits a first write instruction to the external device when the input to the response instructing portion by the operation of the operating unit indicates that the user of the information processing terminal is the owner of the recording medium. Based on the first write instruction, the external device writes the identification information of the information processing terminal as the notification destination identification information, into the recording medium attached to the attaching unit. Thereby, when the recording medium is attached to the external device again, the information processing system provides the notification about the recording medium to only this information processing terminal. That is, the information processing system can appropriately provide the notification about the recording medium.

In the information processing system of the item (6), each of the information processing terminals regularly execute obtaining of the media information from the external device, when the confirmation message and the response instructing portion are displayed on the displaying unit. That is, the information processing terminal can regularly monitor a content change of the media information. As a result, at a time point when there is a content change in the media information, the information processing terminal can take various responses such as a display of the confirmation message and the response instructing portion, without intervention through user operation.

In the information processing system of the item (7), when the confirmation message and the response instructing portion are displayed on the displaying unit, under the conditions that the media information includes the notification destination identification information and that the notification destination identification information differs from the identification information of the information processing terminal, the information processing terminal deletes the display of the confirmation message and the response instructing portion. That is, when another information processing terminal in the information processing system transmits the first write instruction and the notification destination identification information related to the another information processing terminal is written into the recording medium, the information processing terminal deletes the confirmation message and the response instructing portion. As a result, in the information processing terminal related to a user who requires no notification about the recording medium attached to the attaching unit, the confirmation message and the response instructing portion are automatically deleted even when the user performs no particular operation. That is, the information processing system will not request the deletion operation for the confirmation message and the response instructing portion to the user who is not associated with the recording medium. Therefore, the information processing system will not disrupt a user's work by the operation in response to the confirmation message and the response instructing portion.

In the information processing system of the item (8), each of the information processing terminals displays the selection screen on the displaying unit, when the input to the response instructing portion by the operation of the operating unit indicates that the user of the information processing terminal is the owner of the recording medium. According to the information processing system, the user can select the desired process content via the selection screen immediately after the write instruction of the notification destination identification information. As a result, the information processing system can improve work efficiency of the user who desires to process the data stored in the recording medium.

In the information processing system of the item (9), each of the information processing terminals transmits the second write instruction to the external device, based on the selection operation for the process content displayed on the selection screen. Then, the external device writes, as the media information, the process content designating information indicating the process content selected by the user, into the recording medium, based on the second write instruction. Therefore, the process content designating information can be obtained by the information processing terminal as the media information, when the recording medium is attached to the attaching unit later. Thereby, the information processing system can immediately perform the process corresponding to the process content designating information based on the process content designating information obtained as the media information, thereby alleviating the workload of the user.

The information processing terminal of the item (10) is connected to the external device provided with an attaching unit to which the recording medium is detachably attached so as to make communication possible. Each of the information processing terminals obtains the media information about a recording medium attached to the attaching unit from the external device. Then, the information processing terminal detects whether notification destination identification information is included in the obtained media information. When the detected notification destination identification information matches the identification information unique to the information processing terminal, the information processing terminal specifies that a user is an owner of the recording medium attached to the attaching unit of the external device and provides a notification about the recording medium. Therefore, when a plurality of information processing terminals are connected to a single external device, only the information processing terminal in which the notification destination identification information matches the identification information, of the plurality of information processing terminals, provides the notification about the recording medium. As a result, the user who uses the recording medium can reliably comprehend the notification content via the information processing terminal. Also, the other information processing terminals in which the notification destination identification information does not match the identification information will not disrupt a user's work by the notification about the recording medium. Therefore, the information processing terminal can appropriately provide the notification about the recording medium.

The information processing terminal of the item (11) determines whether the most recent media information held by the holding unit differs from the media information newly obtained by the obtaining unit. That is, the information processing terminal determines whether there is a change in the media information. Then, when there is a change in the media information, the information processing terminal provides the notification about the recording medium. That is, when the media information is changed and as a result, there occurs a need for the user to comprehend the change, the information processing terminal provides the notification. Consequently, the information processing terminal can provide the notification about the recording medium at the appropriate moment according to necessity. Also, the information processing terminal can prevent the repeated provision of the notification about the recording medium indicating the same content.

The information processing terminal of the item (12) displays the selection screen as the notification about the recording medium. The selection screen displays a process executed on data stored in the recording medium in a selectable manner. As a result, the user can immediately select the process content on the data stored in the recording medium. That is, the information processing terminal can provide the convenience that the process content desired by the user can be executed on the data in the recording medium attached to the external device, without performing complicated operations.

The information processing terminal of the item (13) provides the destination request notification when the notification destination identification information is not included in the media information. For example, in a state that a plurality of information processing terminals are connected to a single external device, when the notification destination of the notification about the recording medium cannot be specified (that is, when the owner of the recording medium cannot be specified), all the information processing terminals connected to the external device individually provide the destination request notification. As a result, according to the information processing terminal, the user can comprehend that the recording medium is attached to the external device by the destination request notification. As a result, the information processing terminal can prevent a state that the recording medium is attached to the external device and left as it is. Also, the destination request notification is a notification for requesting an input of the notification destination identification information for the recording medium. Therefore, according to the information processing terminal, the user can comprehend near the information processing terminal that the recording medium of which the owner cannot be specified based on the notification destination identification information is attached to the external device.

Further, the computer readable medium of the item (14) storing the control program executed in the information processing terminal that can communicate with the external device provided with an attaching unit to which the recording medium is detachably attached, and thereby, an advantage similar to that provided in the information processing terminal of the item (10) can be exhibited.

The computer readable medium of the item (15) stores the control program executed in the information processing terminal that can communicate with the external device provided with the attaching unit to which the recording medium is detachably attached, and thus, an advantage similar to that provided in the information processing terminal of the item (13) can be exhibited.

What is claimed is:

1. An information processing system, comprising:
   an external device comprising an attaching unit configured to allow a recording medium configured to record data to be detachably attached; and
   a plurality of information processing terminals, each of the information processing terminals comprising a communicating unit configured to perform data communication with the external device,
   wherein each of the information processing terminals comprises:
      a storage unit configured to store identification information unique to the information processing terminal;
      an obtaining unit configured to obtain media information from the external device, the media information relating to the recording medium attached to the attaching unit;
      a detecting unit configured to detect notification destination identification information from the media information obtained by the obtaining unit, the notification destination identification information indicating a notification destination of information relating to the recording medium;
      a first determining unit configured to determine whether the notification destination identification information detected by the detecting unit matches the identification information stored in the storage unit; and
      a notification executing unit configured to execute a notification relating to the recording medium attached to the attaching unit, if the first determining unit determines that the notification destination identification information matches the identification information, and
   wherein the notification destination identification information comprises user identification information and information indicating an information processing terminal used by an owner of the recording medium.

2. The information processing system according to claim 1, wherein each of the information processing terminals further comprises:
   a holding unit configured to hold the media information obtained by the obtaining unit;
   a second determining unit configured to determine, in response to the obtaining unit obtaining new media information, whether the new media information differs from most recent media information which is most recent before the new media information and held in the holding unit; and
   a notification controlling unit configured to control the notification executing unit so as to execute the notification relating to the recording medium attached to the attaching unit, if the second determination unit determines that the new media information differs from the most recent media information.

3. The information processing system according to claim 1, wherein each of the information processing terminals further comprises a displaying unit configured to display information, and
   wherein the notification executing unit displays a selection screen on the displaying unit, the selection screen allows a selection of a process executed on the data stored in the recording medium.

4. The information processing system according to claim 1, wherein each of the information processing terminals further comprises a notification controlling unit configured, if the detecting unit does not detect the notification destination identification information from the media information obtained by the obtaining unit, to control the notification executing unit so as to execute a destination request notification that requests an input of the notification destination identification information for the recording medium related to the media information.

5. The information processing system according to claim 4, wherein each of the information processing terminals further comprises:
   a displaying unit configured to display information;
   an operating unit configured to receive an operation; and
   an instructing unit configured to transmit an instruction to the external device via the communicating unit, wherein the notification executing unit provides the destination request notification by displaying on the displaying unit, a confirmation message confirming whether or not a user of the information processing terminal is an owner of the recording medium, and a response instructing portion allowing an input whether the user of the information processing terminal is the owner of the recording medium, wherein the instructing unit transmits a first write instruction to the external device via the communicating unit, the first write instruction instructing that the identification information stored in the storage unit to be written into the recording medium as the notification destination identification information, if the input to the response instructing portion via the operating unit indicates that the user of the information processing terminal is the owner of the recording medium, and wherein the external device comprises:
 a writing unit configured to write information into the recording medium; and
 a write controlling unit configured to control the writing unit to write the identification information into the recording medium as the notification destination identification information, in response to receiving the first write instruction.

6. The information processing system according to claim 5, wherein each of the information processing terminals comprises an obtaining controlling unit configured to control the obtaining unit to regularly obtain the media information from the external device, when the confirmation message and the response instructing portion are displayed on the displaying unit.

7. The information processing system according to claim 6, wherein, when the confirmation message and the response instructing portion are displayed on the displaying unit, under conditions that the media information obtained by the obtaining unit includes the notification destination identification information and that the notification destination identification information differs from the identification information stored in the storage unit, the notification controlling unit controls the notification executing unit to delete a display of the confirmation message and the response instructing portion displayed on the displaying unit.

8. The information processing system according to claim 5, wherein the notification controlling unit controls the notification executing unit to display the selection screen on the displaying unit, if the input to the response instructing portion indicates that the user of the information processing terminal is the owner of the recording medium.

9. The information processing system according to claim 8, wherein each of the information processing terminals comprises a process content specifying unit configured to specify a process content to be executed on the data stored in the recording medium which is selected from process contents displayed on the selection screen based on the operating unit receiving an operation for the selection screen, wherein the instructing unit transmits a second write instruction instructing that process content designating information indicating the process content specified by the process content specifying unit be written into the recording medium, to the external device via the communicating unit, and wherein the write controlling unit controls the writing unit to write the process content designating information into the recording medium as the media information, in response to receiving the second write instruction.

10. An information processing terminal, comprising:
 a communicating unit configured to perform data communication with an external device that comprises an attaching unit configured to allow a recording medium configured to record data to be detachably attached;
 a storage unit configured to store identification information unique to the information processing terminal;
 an obtaining unit configured to obtain media information from the external device, the media information relating to the recording medium attached to the attaching unit;
 a detecting unit configured to detect notification destination identification information from the media information obtained by the obtaining unit, the notification destination identification information indicating a notification destination of information relating to the recording medium;
 a first determining unit configured to determine whether the notification destination identification information detected by the detecting unit matches the identification information stored in the storage unit; and
 a notification executing unit configured to execute a notification relating to the recording medium attached to the attaching unit, if the first determining unit determines that the notification destination identification information matches the identification information, and
 wherein the notification destination identification information comprises user identification information and information indicating the information processing terminal used by an owner of the recording medium.

11. The information processing terminal according to claim 10, further comprising:
 a holding unit configured to hold the media information obtained by the obtaining unit;
 a second determining unit configured to determine, in response to the obtaining unit obtaining new media information, whether the new media information differs from most recent media information which is most recent before the new media information and held in the holding unit; and
 a notification controlling unit configured to control the notification executing unit so as to execute the notification relating to the recording medium attached to the attaching unit, if the second determination unit determines that the new media information differs from the most recent media information.

12. The information processing terminal according to claim 10, further comprising a displaying unit configured to display information,
 wherein the notification executing unit displays a selection screen on the displaying unit, the selection screen allows a selection of a process executed on the data stored in the recording medium.

13. The information processing terminal according to claim 10, further comprising the notification controlling unit configured, if the detecting unit does not detect the notification destination identification information from the media information obtained by the obtaining unit, to control the notification executing unit so as to execute a destination request notification that requests an input of the notification destination identification information for the recording medium related to the media information.

14. A non-transitory computer readable medium storing a control program that, when executed by an information processing terminal, causes the information processing terminal to operate as:
 a communicating unit configured to perform a data communication with an external device that comprises an attaching unit configured to allow a recording medium configured to record data to be detachably attached;

a storage unit configured to store identification information unique to the information processing terminal; and a notifying unit configured to provide various notifications, said control program, when executed, enables the information processing terminal to execute:

obtaining media information from the external device, the media information relating to the recording medium attached to the attaching unit;

detecting notification destination identification information from the obtained media information, the notification destination identification information indicating a notification destination of information relating to the recording medium;

determining whether the detected notification destination identification information matches the identification information stored in the storage unit; and executing a notification relating to the recording medium attached to the attaching unit, if it is determined that the detected notification destination identification information matches the identification information, wherein the notification destination identification information comprises user identification information and information indicating the information processing terminal used by an owner of the recording medium.

15. The non-transitory computer readable medium according to claim 14, wherein the control program, when executed by the information processing terminal, causes the information processing terminal to execute a destination request notification that requests an input of the notification destination identification information for a recording medium related to the media information, if the notification destination identification information is not detected from the media information.

* * * * *